Jan. 1, 1963 J. E. DUNCAN ETAL Re. 25,312
GLASS COMPOSITION
Original Filed Feb. 25, 1957
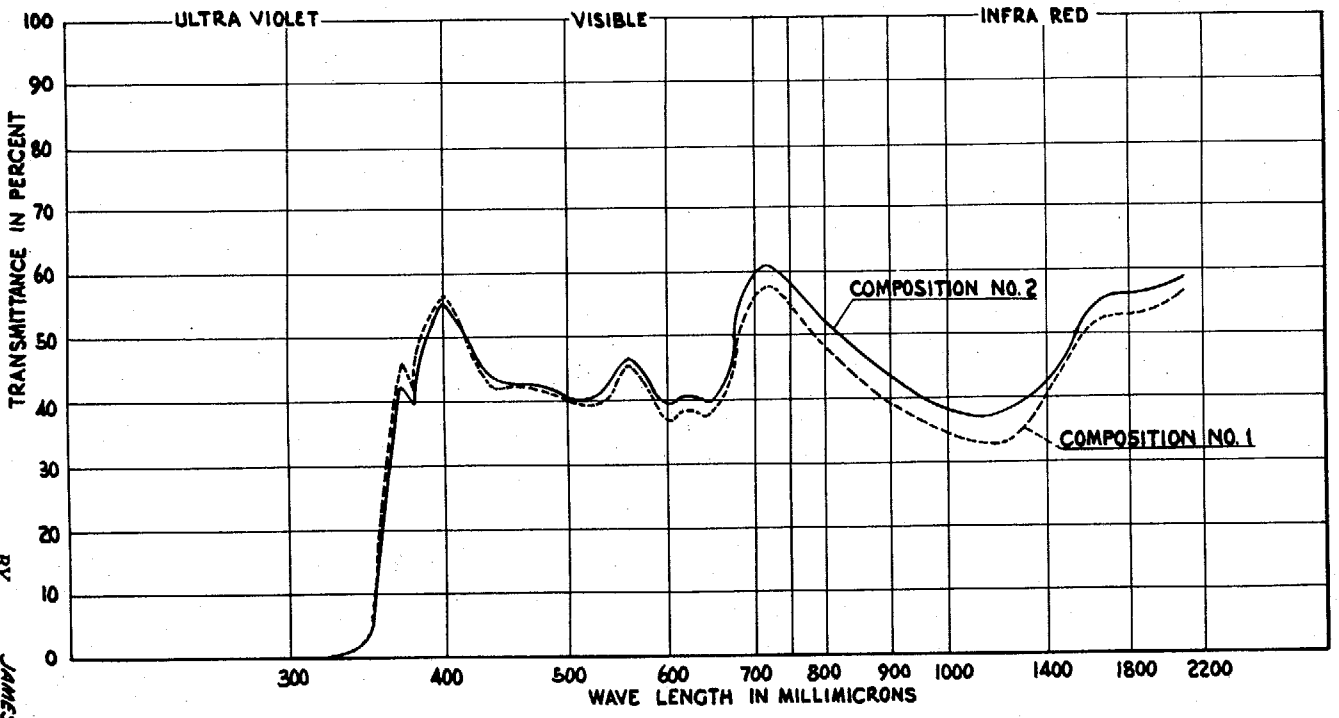
INVENTORS
JAMES E. DUNCAN and
GEORGE L. THOMAS
BY
Oscar Spencer
ATTORNEY United States Patent Office Re. 25,312
Reissued Jan. 1, 1963

25,312
GLASS COMPOSITION

James E. Duncan, Natrona Heights, Pa., and George L. Thomas, Parma, Ohio, assignors to Pittsburgh Plate Glass Company, Allegheny County, Pa., a corporation of Pennsylvania Original No. 2,938,808, dated May 31, 1960, Ser. No. 642,275, Feb. 25, 1957. Application for reissue May 15, 1961, Ser. No. 120,104
11 Claims. (Cl. 106—52)

Matter enclosed in heavy brackets [ ] appears in the original patent but forms no part of this reissue specification; matter printed in italics indicates the additions made by reissue.

The present invention relates to a neutral gray colored, heat absorbing glass and it has particular relation to a neutral gray colored, heat absorbing sheet or plate glass having controlled energy and light transmittance characteristics.

Architects and building owners have shown an increasing interest in glazing windows in buildings with a neutral or gray colored glass. This type of glass is desired to reduce glare and to provide a pleasing color in combination with interior decorations. It is also desired that the glass absorb a substantial portion of the heat from the sun's rays. This reduces the load on air conditioning systems employed to control the temperature of the interior of the building and permits the use of smaller and less costly systems.

In order for a glazing glass to qualify as a heat absorbing glass, it must have a total solar energy transmittance of less than 50 percent at one-quarter inch thickness. This standard has been established by Federal Specification DD–G–451A. The conventional type of heat absorbing glass has a bluish-green color imparted to it by the incorporation of controlled amounts of iron oxide in the glass. The bluish-green color of this type of glass is objected to by architects and building owners for aesthetic reasons. It is therefore an object of the present invention to provide a pleasing gray colored, heat absorbing glass which is suitable for glazing windows in building structures.

The development of a neutral gray glass having a pleasing color has required a careful consideration of the transmittance characteristics of the glass. The luminous transmittance must be limited in order to provide the desired protection from glare or excessive brightness. Glasses are available which have proper heat absorptive properties but which have undesirably low luminous transmittance. If the luminous transmittance is limited to too great an extent, the glass presents a degree of dreariness or depression on dark days.

The present invention contemplates a neutral gray, heat absorbing glass having a luminous transmittance of between 35 and 45 percent, preferably about 40 percent, at ¼ inch thickness. This is a radical departure from glasses presently known and used in buildings.

The luminous transmittance is the summation of the percentage of the incident, visible radiant energy (weighted by the energy distribution of the source and the eye's sensitivity) that will pass through the glass as described. In the present invention the source, unless otherwise stated, is Illuminant "C", a standard source adopted by the International Commission on Illumination.

It is desired that the glass approach absolute neutrality of color for aesthetic reasons. A neutral colored glass with a very slight bluish tint has been found to provide the most pleasing colored glass. A sheet of the glass ¼ inch in thickness should have substantially uniform transmittance of light in the portion of the spectrum lying between 440 and 660 millimicrons, an excitation purity of less than about 7 percent and a dominant wavelength between 470 and 515 millimicrons.

The specifications for determining color, such as the dominant wavelength and excitation purity, have been derived from tristimulus values that have been adpoted by the International Commission on Illumination as a direct result of experiments involving many observers. These specifications can be determined by calculating the trichromatic coefficients, x, y and z, from the tristimulus values. The trichromatic coefficients, x and y, are plotted on a chromaticity diagram and compared with the coordinates of Illuminant C as a standard light source. This comparison provides the information to determine the excitation purity and dominant wavelength. The lower the excitation purity of a color, the closer it is to being a neutral color. An understanding of these terms and definitions thereof may be had by referring to the Handbook of Colorimetry prepared by the staff of the Color Measurement Laboratory, Massachusetts Institute of Technology, under the direction of Arthur C. Hardy. This book was printed in 1936 by the Technology Press, Massachusetts Institute of Technology, Cambridge, Massachusetts.

In accordance with the present invention, a glass having the desired color and transmittance properties is provided. Such a glass contains by weight 60 to 75 percent $SiO_2$, 11 to 20 percent $Na_2O$, 0 to 10 percent $K_2O$, the sum of $Na_2O$ and $K_2O$ being 11 to 21 percent, 6 to 16 percent CaO, 0 to 10 percent MgO, the sum of CaO and MgO being 6 to 18 percent, 0.2 to 1 percent $Fe_2O_3$, 0.003 to 0.05 percent NiO, 0.003 to 0.02 percent CoO and 0.003 to 0.2 percent Se. $Fe_2O_3$, NiO, CoO and Se serve as the colorants for the glass. Compositions which are illustrative of the present invention are as follows:

| Ingredient and Property | Glass Compositions | |
|---|---|---|
| | 1 | 2 |
| $SiO_2$ | 72.0 | 71.2 |
| $Na_2O$ | 14.0 | 13.7 |
| CaO | 12.5 | 11.8 |
| MgO | 0.3 | 2.3 |
| $SO_3$ | 0.4 | 0.4 |
| $Al_2O_3$ | 0.2 | 0.2 |
| $Fe_2O_3$ | 0.4 | 0.4 |
| CoO | 0.0076 | 0.008 |
| NiO | 0.0126 | 0.009 |
| Se | 0.0056 | 0.005 |
| Thickness of sample in inches | 0.252 | 0.25 |
| Luminous transmittance for Illuminant C percent | 40.7 | 42.2 |
| Total Solar Ultraviolet Transmittance do | 33.7 | 31.2 |
| Total Solar Infrared Transmittance do | 40.9 | 44.9 |
| Total Solar Energy Transmittance do | 43.5 | 46.3 |
| Trichromatic Coefficients: | | |
| x | 0.3035 | 0.3052 |
| y | 0.3123 | 0.3123 |
| z | 0.3842 | 0.3825 |
| Dominant Wavelength (millimicrons) | 483 | 480 |
| Excitation Purity percent | 2.4 | 2.3 |

Radiant energy transmittance curves for the illustrative glasses set forth above are shown in the single figure of the drawing. The percent transmittance of the glasses described above at the various wavelengths is as follows:

| Wavelength, Millimicrons | Percent Transmittance | |
|---|---|---|
| | 1 | 2 |
| Ultraviolet: | | |
| 300 | 0.0 | 0.0 |
| 310 | 0.0 | 0.0 |
| 320 | 0.0 | 0.0 |
| 330 | 0.0 | 0.5 |
| 340 | 1.5 | 1.1 |
| 350 | 13.0 | 10.5 |
| 360 | 33.9 | 29.5 |
| 370 | 46.0 | 42.8 |
| 380 | 42.2 | 39.8 |
| 390 | 53.7 | 51.1 |
| Visible: | | |
| 400 | 56.2 | 55.7 |
| 420 | 47.8 | 48.6 |
| 440 | 42.0 | 43.6 |
| 460 | 42.1 | 43.5 |
| 480 | 41.5 | 42.4 |
| 500 | 40.3 | 41.1 |
| 520 | 39.0 | 39.9 |
| 540 | 40.7 | 42.1 |
| 560 | 45.3 | 46.7 |
| 580 | 40.6 | 42.1 |
| 600 | 37.1 | 39.0 |
| 620 | 38.3 | 40.2 |
| 640 | 37.4 | 39.4 |
| 660 | 39.5 | 41.6 |
| 680 | 47.3 | 50.9 |
| 700 | 56.6 | 59.7 |
| 720 | 57.8 | 61.1 |
| 740 | 55.8 | 59.3 |
| 750 | 54.4 | 58.1 |
| Infrared: | | |
| 800 | 47.9 | 52.0 |
| 900 | 38.8 | 43.3 |
| 1,000 | 34.7 | 39.1 |
| 1,100 | 32.2 | 36.8 |
| 1,200 | 32.6 | 37.4 |
| 1,300 | 35.5 | 39.8 |
| 1,400 | 40.2 | 43.5 |
| 1,500 | 45.8 | 46.3 |
| 1,600 | 51.0 | 54.2 |
| 1,700 | 52.2 | 55.7 |
| 1,800 | 52.5 | 56.0 |
| 1,900 | 53.0 | 56.1 |
| 2,000 | 54.6 | 57.2 |
| 2,100 | 56.8 | 59.5 |

Glasses within the purview of the present invention may have transmittance curves in the visible portion of the spectrum which vary about 8 percent in transmittance above or 8 percent in transmitance below the transmittance curve for composition No. 2 above.

The spectral transmittance measurements of the glasses of the present invention are made by standard spectrophotometric methods utilizing three different spectrophotometers. A Bechman Quartz Spectrophotometer, Model DU is used for wavelengths between 300 and 400 millimicrons and between 750 and 1000 millimicrons. A General Electric Recording Spectrophotometer, Model No. 5962005G3 is used for the visible range of the spectrum, 400 to 750 millimicrons. A Perkin-Elmer Spectrophotometer, Model 12 having a NaCl prism is used for wavelengths above 1000 millimicrons. The total solar energy transmittance of the glass is calculated from the spectral transmittance of the glass and the spectral distribution of solar radiant energy. The latter values are those of Parry Moon (Journal of the Franklin Institute, vol. 230, November 1940).

The glasses illustrated as Compositions Nos. 1 and 2 above represent preferred compositions for ¼ inch thickness. The amounts of the colorants, $Fe_2O_3$, CoO, NiO and Se, must be carefully controlled to achieve the desired color and transmittance characteristics at various thicknesses. When the glasses are fabricated at greater or lesser thicknesses than ¼ inch, it is necessary to decrease or increase respectively the amounts of each colorant to obtain the desired color and transmittance characteristics. For example, when the glass is produced in ⅛ inch thickness, the amount of each of the colorants may be approximately doubled to achieve the same color and transmittance characteristics.

$SiO_2$ is the glass former. Sodium oxide is present as a flux to reduce the melting temperature of the glass. Potassium oxide may be employed in place of a portion of the $Na_2O$, but the use of $Na_2O$ is preferred because it is less expensive. The total amount of alkali metal oxide in the glass should be 11 to 21 percent by weight. CaO and MgO are also employed as fluxes. They are used to supplement the $Na_2O$ because they improve the chemical durability of the glass. The amount of alkaline earth metal oxides in the glass should be 6 to 18 percent by weight.

Alumina may be present in the glass in varying amounts, depending mainly upon the manner in which the glass is formed. Alumina is employed to regulate the viscosity of the glass, improve its durability and prevent devitrification of the glass. Relatively small amounts of alumina are employed when the glass is formed in a pot. Up to about 5 percent by weight, preferably 1 to 3.5 percent by weight, of alumina is employed for producing sheet glass according to conventional continuous drawing techniques.

$Fe_2O_3$ is employed principally to provide the desired heat absorbing properties to the glass. CoO, NiO and Se are present in combination with $Fe_2O_3$ to provide the desired luminous and total energy transmittance and color to the glass. It is well known to the art that cobalt oxide gives a blue color and nickel oxide a reddish brown and the proper combination gives a neutral or blue-gray color. Iron oxide produces a bluish green, selenium a pink color and the combination of the iron oxide and selenium produces a gray with a green or brown cast depending on the proportions of the colorants. With the proper combination of the four colorants it has been discovered that a pleasing neutral or gray color can be produced. Such glass does not have an undesirable greenish brown cast and has sufficient heat absorptive properties to make it unusually attractive for glazing windows in buildings.

The glasses of the invention may be produced from conventional glass making materials properly compounded and thoroughly mixed so as to yield, when reacted, glasses of the desired ultimate composition. Suitable batch materials include sand, soda ash, potassium carbonate, limestone, dolomite, salt cake, common salt, sodium nitrate, arsenious oxide, antimony oxide, aplite, rouge, cobalt oxide, nickel oxide and selenium metal. The salt cake, common salt, sodium nitrate, antimony oxide, arsenious oxide and combinations thereof may be present in the batch to act as refining agents.

Various size pots or crucibles may be employed and the melting temperatures and times will vary according to the amount being formed. Also, the glass may be formed continuously in the form of a sheet when made in a tank. The temperatures and melting conditions herein recited may be employed to make 85 to 100 pounds of glass in a refractory pot in a furnace heated by the controlled combustion of natural gas.

An empty pot is preheated in the furnace at a furnace temperature of about 2100° F. A portion of the mixed batch is ladled into the preheated pot and the furnace temperature is gradually increased. The remaining portion of the mixed batch is ladled into the pot over a period of two hours and the temperature is gradually raised to about 2650° F. during this time. The temperature is maintained at 2650° F. for the next 3¾ hours to refine the glass. At the end of this time, the chemical reactions are completed, the glass is free of bubbles and is substantially homogeneous.

In the preparation of the glasses of the present invention, it is desired that the glass be produced under neutral to slightly oxidizing conditions in the melting furnace or container.

After the glass is refined, the temperature of the furnace is reduced to 2100° F. over a period of ¾ hour. The furnace is then held at this temperature for ½ hour. The pot is removed from the furnace and the glass is poured on a metal table and rolled into the form of a plate. The plate is placed in a kiln and cooled from 1150° F. to 800° F. at a rate of about 7° per minute. Thereafter, it is cooled more rapidly to room temperature and subsequently cut into pieces suitable for grinding, polishing and testing.

The glass as thus produced represents a fresh approach; a change in the appearance of glazing glasses. It provides architects with complete freedom from color problems in daylight for interior planning. The careful selection of colorants permits the production of a glass having excellent brightness or glare control. It also permits the production of a glass having a high order of solar heat absorption with a pleasing neutral color. These properties can be readily reproduced in successive melts of the glass.

Although the present invention has been described with reference to specific details of certain embodiments, it is not intended that such details act as limitations upon the scope of the invention except insofar as included in the accompanying claims.

We claim:

1. An article of manufacture comprising a neutral colored sheet of glass ⅛ to ¼ inch in thickness suitable for glazing purposes and having substantially uniform transmission of light in the portion of the spectrum lying between 440 and 660 millimicrons, an excitation purity of below 7 percent, a total solar energy transmittance of between 40 and 48 percent and a total luminous transmittance between 35 and 45 percent, the glass consisting essentially of the following base ingredients in percent by weight: 60 to 75% $SiO_2$, 11 to 20% $Na_2O$, 0 to 10% $K_2O$, the sum of $Na_2O$ and $K_2O$ being 11 to 21%, 6 to 16% CaO and 0 to 10% MgO, the sum of CaO and MgO being 6 to 18%, together with 0.4% $Fe_2O_3$, 0.0076 to 0.008% CoO, 0.009 to 0.0126% NiO and 0.005 to 0.0056% Se at ¼ inch thickness, the amount of the colorants, $Fe_2O_3$, CoO, NiO and Se, being greater as the thickness of the sheet is less than ¼ inch and being approximately twice the above listed amount for each colorant when the thickness of the sheet is ⅛ inch.

2. A neutral gray colored, heat absorbing glass having substantially uniform transmittance of light in the portion of the spectrum lying between 440 and 660 millimicrons, an excitation purity below 7 percent, a total solar energy transmittance of between 40 and 48 percent and a total luminous transmittance between 35 and 45 percent, said glass consisting essentially of the following ingredients in percent by weight: 60 to 75% $SiO_2$, 11 to 20% $Na_2O$, 0 to 10% $K_2O$, the sum of $Na_2O$ and $K_2O$ being 11 to 21%, 6 to 16% CaO and 0 to 10% MgO, the sum of CaO and MgO being 6 to 18%, together with 0.4% $Fe_2O_3$, 0.0076 to 0.008% CoO, 0.009 to 0.126% NiO and 0.005 to 0.0056% Se.

3. The glass described in claim 2 containing up to 5% $Al_2O_3$.

4. A neutral gray colored, heat absorbing glass having substantially uniform transmittance of light in the portion of the spectrum lying between 440 and 660 millimicrons and an excitation purity below 7 percent consisting essentially of the following ingredients in percent by weight: 60 to 75 percent $SiO_2$, 11 to 20 percent $Na_2O$, 0 to 10 percent $K_2O$, the sum of $Na_2O$ and $K_2O$ being 11 to 21 percent, 6 to 16 percent CaO, 0 to 10 percent MgO, the sum of CaO and MgO being 6 to 18 percent, 0.2 to 1 percent $Fe_2O_3$, 0.003 to 0.05 percent NiO, [0.0003] *0.003* to 0.02 percent CoO and 0.003 to 0.2 percent Se.

5. The glass described in claim 4 containing up to 5 percent $Al_2O_3$.

6. An article of manufacture comprising a neutral gray colored, heat absorbing sheet of glass at a thickness suitable for glazing so as to have substantially uniform transmission of light in the portion of the spectrum lying between 440 and 660 millimicrons, an excitation purity of below 7 percent and a total luminous transmittance between 35 to 45 percent, the glass consisting essentially of the following ingredients in percent by weight: 60 to 75 percent $SiO_2$, 11 to 20 percent $Na_2O$, 0 to 10 percent $K_2O$, the sum of $Na_2O$ and $K_2O$ being 11 to 21 percent, 6 to 16 percent CaO, 0 to 10 percent MgO, the sum of CaO and MgO being 6 to 18 percent, 0.2 to 1 percent $Fe_2O_3$, 0.003 to 0.05 percent NiO, 0.003 to 0.02 percent CoO and 0.003 to 0.2 percent Se.

7. The article of manufacture described in claim 6 wherein the glass contains up to 5 percent $Al_2O_3$.

*8. A neutral gray colored, heat absorbing glass having substantially uniform transmittance of light in the portion of the spectrum lying between 440 and 660 millimicrons and an excitation purity below 7 percent consisting essentially of the following ingredients in percent by weight: 60 to 75 percent $SiO_2$, 11 to 20 percent $Na_2O$, 0 to 10 percent $K_2O$, the sum of $Na_2O$ and $K_2O$ being 11 to 21 percent, 6 to 16 percent CaO, 0 to 10 percent MgO, the sum of CaO and MgO being 6 to 18 percent, 0.2 to 1 percent $Fe_2O_3$, 0.003 to 0.005 percent NiO, 0.003 to 0.02 percent CoO and up to 0.2 percent Se in an amount coordinated with the amount of $Fe_2O_3$ sufficient to neutralize the bluish green color imparted by said $Fe_2O_3$ whereby to produce a neutral gray color and in an amount in combination with NiO and CoO to produce a glass having said transmittance properties.*

*9. The glass described in claim 8 containing up to 5 percent $Al_2O_3$.*

*10. An article of manufacture comprising a neutral gray colored, heat absorbing sheet of glass at a thickness suitable for glazing so as to have substantially uniform transmission of light in the portion of the spectrum lying between 440 and 660 millimicrons, an excitation purity of below 7 percent and a total luminous transmittance between 35 to 45 percent, the glass consisting essentially of the following ingredients in percent by weight: 60 to 75 percent $SiO_2$, 11 to 20 percent $Na_2O$, 0 to 10 percent $K_2O$, the sum of $Na_2O$ and $K_2O$ being 11 to 21 percent, 6 to 16 percent CaO, 0 to 10 percent MgO, the sum of CaO and MgO being 6 to 18 percent, 0.2 to 1 percent $Fe_2O_3$, 0.003 to 0.05 percent NiO, 0.003 to 0.02 percent CoO and up to 0.2 percent Se in an amount coordinated with the amount of $Fe_2O^3$ sufficient to neutralize the bluish green color imparted by said $Fe_2O_3$ whereby to produce a neutral gray color and in an amount in combination with NiO and CoO to produce a glass having said transmittance properties.*

*11. The article of manufacture described in claim 10 wherein the glass contains up to 5 percent $Al_2O_3$.*

References Cited in the file of this patent or the original patent

UNITED STATES PATENTS 2,524,719 Tillyer ---------- Oct. 3, 1950

OTHER REFERENCES

Glastechnische Tabellen, Eitel-Pirani-Scheel, 1932 edition, page 650.

Tooley: Handbook of Glass Manufacture, Ogden Publishing Co., 1953, pages 73 and 74.